United States Patent [19]

Modic et al.

[11] Patent Number: 5,461,111
[45] Date of Patent: Oct. 24, 1995

[54] BLENDS OF POLYSTYRENE/POLYPROPYLENE GRAFTED POLYMERS AND ELASTOMERIC BLOCK COPOLYMERS

[75] Inventors: Michael J. Modic, Houston; Richard Gelles, Sugar Land; Lie K. Djiauw, Houston, all of Tex.

[73] Assignee: Shell Oil Company, Houston, Tex.

[21] Appl. No.: 298,628

[22] Filed: Aug. 31, 1994

Related U.S. Application Data

[62] Division of Ser. No. 150,936, Nov. 10, 1993, Pat. No. 5,378,760.

[51] Int. Cl.⁶ .............................. C08L 51/06; C08L 53/02
[52] U.S. Cl. .................................. 525/71; 525/89; 525/98
[58] Field of Search ................................ 525/71, 89, 98

[56] References Cited

U.S. PATENT DOCUMENTS

| | | | |
|---|---|---|---|
| 4,145,377 | 3/1979 | Bussink et al. | 525/89 |
| 4,166,055 | 8/1979 | Lee, Jr. | 524/141 |
| 4,239,673 | 12/1980 | Lee, Jr. | 525/70 |
| 4,242,263 | 12/1980 | Lee, Jr. | 524/141 |
| 4,582,871 | 4/1986 | Noro et al. | 524/413 |
| 4,889,888 | 12/1989 | Bassi et al. | 525/75 |
| 4,990,558 | 2/1991 | DeNicola, Jr. et al. | 524/504 |
| 5,034,449 | 7/1991 | Mallikarjun | 524/504 |
| 5,109,069 | 4/1992 | Shibata et al. | 525/152 |
| 5,278,232 | 1/1994 | Seelert et al. | 525/71 |
| 5,290,837 | 3/1994 | Ghidoni et al. | 525/71 |
| 5,370,813 | 12/1994 | DeNicola, Jr. et al. | 525/68 |

FOREIGN PATENT DOCUMENTS

0449087A2  3/1990  European Pat. Off. .

OTHER PUBLICATIONS

Fetters, L. J. "Synthesis and Characterization of Block Copolymers by Anionic Polymerization", in Meier, D. J., Block Copolymers, Science and Technology (New York, Harwood, 1983), pp. 17–38.

*Primary Examiner*—Paul R. Michl
*Assistant Examiner*—Mark L. Warzel
*Attorney, Agent, or Firm*—Keith M. Tackett

[57] ABSTRACT

Compositions comprising a polypropylene grafted with polystyrene and a selectively hydrogenated monoalkenyl aromatic/conjugated diene block copolymer have improved melt viscosity and toughness when the block copolymer component is designed to have weak monoalkenyl aromatic domains.

2 Claims, No Drawings

BLENDS OF POLYSTYRENE/POLYPROPYLENE GRAFTED POLYMERS AND ELASTOMERIC BLOCK COPOLYMERS

This is a division of application Ser. No. 08/150,936, filed Nov. 10, 1993, U.S. Pat. No. 5,378,760.

FIELD OF THE INVENTION

The invention relates to compositions that contain grafted polypropylene polymers and elastomeric block copolymers. More specifically, the invention relates to blends of styrenic block copolymers and polypropylene that is grafted with polystyrene.

BACKGROUND OF THE INVENTION

U.S. Pat. No. 4,990,558 describes graft-copolymer-based rigid thermoplastic compositions comprising, by weight: (a) about 60–95% by weight of the polymer components of a graft copolymer comprising about 10–65% by weight of the graft copolymer of a styrene polymer grafted onto a backbone of propylene material, and, complimentary (b) about 40–5% by weight of the polymer components of a rubber component comprising (1) about from 20–100% by weight of the rubber component of (i) at least one monoalkenyl aromatic hydrocarbon-conjugated diene block copolymer, (ii) at least one block copolymer which is a hydrogenated product of (i), or (iii) a mixture of at least one (i) block copolymer with at least one (ii) block copolymer, and (2) from about 80–0% by weight of the rubber component of an olefin copolymer rubber, e.g., EPM (ethylene-propylene monomer rubber). Optionally this formulation can contain 5–30 parts of a propylene polymer material per 100 parts of the graft copolymer and rubber component.

Modifying graft copolymers of styrene polymers on substrates of propylene polymer material by blending with a monoalkenyl aromatic hydrocarbon-conjugated diene block copolymer was found to improve the impact strength and ductility of the graft copolymers. Combinations of block copolymer and olefin copolymer rubbers gave a greater improvement in the graft copolymer's impact strength and ductility than was observed for the block copolymer alone. The examples describe thermoplastic compositions that contain block copolymers having the structure polystyrene-hydrogenated polybutadiene-polystyrene (S-EB-S) or polystyrene-hydrogenated polyisoprene (S-EP). The block copolymer is broadly defined to include S-EP-S and S-EB structures as well as branched and radial variations of the block copolymers.

SUMMARY OF THE INVENTION

Compositions comprising from 60% to 95% by weight of the polymer components of a grafted polypropylene and from 40% to 5% by weight of the polymer components of a rubber component comprising a selectively hydrogenated styrene/diene block copolymer have significantly improved melt viscosity and toughness when the block copolymer component is designed to have weak styrene domains.

DETAILED DESCRIPTION OF THE INVENTION

The present invention provides a rigid thermoplastic composition comprising about 60–95% by weight of the polymer components of a graft copolymer comprising about 10–65% by weight of the graft copolymer of a styrene polymer grafted onto a backbone of propylene material, and, about 40–5% by weight of the polymer components of a rubber component comprising (1) from about 20–100% by weight of the rubber component of a selectively hydrogenated block copolymer which has weak styrene domains and from about 80–0% by weight of the rubber component of an olefin copolymer rubber, e.g., EPM (ethylene-propylene monomer rubber). The rigid composition has significantly improved toughness and melt viscosity in comparison to similar compositions containing different styrenic block copolymers.

Preferably the selectively hydrogenated block copolymer is selected from a group of block copolymers having weak monoalkenyl aromatic domains, the group comprising tetrablock copolymers having the structure monoalkenyl aromatic-hydrogenated conjugated diene-monoalkenyl aromatic-hydrogenated conjugated diene, asymmetric triblock copolymers having the structure monoalkenyl aromatic-hydrogenated conjugated diene-monoalkenyl aromatic wherein one monoalkenyl aromatic block is significantly greater in peak MW than the other monoalkenyl aromatic block, and symmetric triblock copolymers having the structure monoalkenyl aromatic-hydrogenated isoprene-monoalkenyl aromatic.

The major component in the blends of the present invention is a styrenic grafted propylene polymer material as described in U.S. Pat. No. 4,990,558, which is incorporated by reference herein. Styrenic grafted propylene polymer material as used in this specification means those grafted propylene polymer materials where the styrenic grafting monomer is styrene, an alkyl ring-substituted styrene where the alkyl is methyl or ethyl, combinations thereof wherein the alkyl ring-substituted styrene is present in an amount of from 5 to 95%, or a combination of styrene or an alkyl ring-substituted styrene with 5 to 40% of alphamethylstyrene or alpha-methyl-styrene derivatives. Preferred grafting monomers are styrene and mixtures of styrene and alpha-methylstyrene.

The propylene polymer material backbone of component (b) can be (i) a homopolymer of propylene, (ii) a random copolymer of propylene and an olefin selected from ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%, (iii) a random terpolymer of propylene with two alpha-olefins selected from the group consisting of ethylene and $C_4$–$C_{10}$ alpha olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%, (iv) a homopolymer of (i) or a random copolymer of (ii) impact-modified with from about 5 to 30% of an ethylene-propylene copolymer rubber, or an ethylene-propylene-non-conjugated diene monomer rubber having a diene content of about 2 to 8%. The ethylene content of (iv) being from about 20 to about 70%. The $C_4$–$C_{10}$ alpha-olefins include linear and branched $C_4$–$C_{10}$ alpha-olefins such as 1-butene, 1-pentene, 4-methyl-pentene-1, 3-methyl-1-butene, 1-hexene, 3-4-dimethyl-1-butene, 1-heptene, 3-methyl-1-hexene, 1-octene and the like.

Suitable particulate forms of the grafted propylene polymer material include powder, flake, granulate, spherical, cubic and the like. Spherical particulate forms prepared from a propylene polymer material having a pore volume fraction of at least about 0.07 are preferred.

The styrene monomer, alkyl ring-substituted styrene monomer or methylstyrene derivative, except alpha-methylstyrene, can be used alone or in combination with each other or with alpha-methylstyrene to graft onto the propylene polymer material backbone. All except alpha-methylstyrene and its derivatives readily homopolymerize when used alone and graft copolymerize with each other when two or more are present, including alpha-methylstyrene.

Preferred styrenic grafted propylene polymer materials of the present invention are grafted copolymers of styrene or of styrene and a methylstyrene derivative monomer on polypropylene or on an impact-modified polypropylene backbone.

The styrenic grafted propylene polymer material of the present invention is prepared by the free-radical-initiated graft polymerization of at least one vinyl monomer, at free radical sites on propylene polymer material. The free-radical sites may be produced by irradiation or by a free-radical generating chemical material, e.g. by reaction with a suitable organic peroxide.

According to the method where the free-radical sites are produced by irradiation, the propylene polymer material, preferably in particulate form, is irradiated at a temperature in the range of about 10° to 85° C. with high-energy ionizing radiation to produce free-radical sites in the propylene polymer material. The irradiated propylene polymer material, while being maintained in a substantially non-oxidizing atmosphere, e.g. under inert gas, is then treated at a temperature up to about 100° C. for a period of at least about 3 minutes, with about from 5 to 80% of the particular grafting monomer or monomers used, based on the total weight of propylene polymer material and grafting monomer(s). After the propylene polymer material has been exposed to monomer for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free-radical deactivation of the resulting graft copolymer is conducted preferably by heating, although it can be accomplished by the use of an additive, e.g. methyl-mercaptan, that functions as a free-radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free-radical sites are produced by an organic chemical compound, the organic chemical compound, preferably an organic peroxide, is a free-radical polymerization initiator which has a decomposition half-life of about 1 to 240 minutes at the temperature employed during the treatment. Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butylperoxyisopropylbenzene); peroxy esters, such as tert-butylperoxypivalate, tert-butyl perbenzoate, 2,5-dimethylhexyl 2,5-di(perbenzoate), tert-butyl-di(perphthalate), tert-butylperoxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. The peroxides can be used neat or in a diluent medium, having an active concentration of from 0.1 to 6.0 pph, preferably from 0.2 to 3.0 pph.

According to this method, the propylene polymer material, preferably in particulate form, at a temperature of from about 60° C. to 125° C. is treated with from 0.1 to 6.0 pph of a free-radical polymerization initiator described above. The polymer material is treated with about 5 to 240 pph of a grafting monomer at a rate of addition that does not exceed 4.5 pph per minute at all addition levels of 5 to 240 pph of the monomer, over a period of time which coincides with or follows the period of treatment with the initiator. In other words, the monomer and initiator may be added to the heated propylene polymer material at the same time or the monomer may be added 1) after the addition of the initiator has been completed, 2) after addition of the initiator has started but has not yet been completed or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation. The styrenic grafted propylene polymer material, component (b), is present in the amount of from 30 to 75%, based on the total composition, except in the compositions containing optional component (d). When component (d) is present, component (b) is present in the amount of 5 to 30%, and preferably from 10 to 25%, based on the total composition. In either case, the styrenic grafted propylene polymer material has from 5 to 70% of the styrenic monomer grafted or graft polymerized thereto, and preferably from 10 to 55%.

The elastomeric block copolymers employed in the molding compositions of the present invention have at least two monoalkenyl aromatic polymer blocks, preferably polystyrene blocks S, and at least one hydrogenated conjugated diene block, preferably hydrogenated isoprene (EP) or hydrogenated butadiene (EB), in a linear arrangement. The block copolymers are phase separated with weak monoalkenyl aromatic domains resulting from limiting the structure of the block copolymer and limiting the peak molecular weight of the monoalkenyl aromatic blocks from 4,500 to 10,000.

The monoalkenyl aromatic hydrocarbon-conjugated diene block copolymers have a total peak molecular weight of from 30,000 to 150,000 wherein the proportion of the monoalkenyl aromatic hydrocarbon monomer in the monoalkenyl aromatic hydrocarbon-conjugated diene block copolymer ranges from about 10% to about 25%.

The asymmetric S-EP-S' or S-EB-S' block copolymers have a peak molecular weight from 30,000 to 150,000 and a styrene block(s) peak molecular weight from 4,500 to 10,000 wherein the S block is greater in peak MW than the S' block by at least 50%.

The tetrablock S-EP-S-EP' or S-EB-S-EB' block copolymers have total peak molecular weight from 45,000 to 90,000, wherein the S endblocks has a peak molecular weight from 4,500 to 8,000, the EP or EB midblock has a peak molecular weight from 35,000 to 55,000, the S midblock has a peak molecular weight from 4,500 to 9,000, and the EP' or EB' endblock has a peak molecular weight that is 15% to 35%, preferably 20% to 30%, of the peak molecular weight of the EP or EB midblocks.

The triblock S-EP-S block copolymer have total peak molecular weights from 30,000 to 150,000 wherein the S blocks have peak molecular weights from 4,500 to 7,000, preferably 5,000 to 5,500.

The most preferred block copolymer is an S-EP-S-EP' tetrablock copolymer having peak molecular weights of 5,500 to 7,000 for the S endblock, 40,000 to 50,000 for the midblock, and 6,000 to 8,500 for the S midblock, wherein the EP' endblock is from 20% to 30% of the peak molecular weight of the EP midblock.

The preferred S-EP-S-EP' block polymers used in the invention have low melt viscosity resulting from weak styrene domains that disassociate in the melt to give a one-phase melt instead of conventional two phase melts.

The hydrogenated isoprene (EP) or hydrogenated butadiene (EB) blocks have a residual unsaturation less that 5%, preferably less than 2%. The EP blocks have from 30% to 100% 1,4-addition and the EB blocks have from 20% to 60% 1,4-addition. The block copolymers are readily prepared by anionic polymerization and selective hydrogenation processes known in the art.

The monoalkenyl aromatic hydrocarbon-conjugated diene block copolymer is present in the resin composition in an amount of from 1 to 15% by weight based on the total polymer components, preferably from about 4 to 12% by weight.

Fillers and reinforcing agents, e.g. carbon black and glass fibers, as well as inorganic powders such as calcium carbonate, talc, mica, and glass, may be included in the composition of the invention at concentration levels up to about 80 parts by weight per 100 parts by weight of the polymer components. In addition to the economic benefit such fillers afford, greater stiffness and a higher heat distortion temperature can be attained.

The components of the composition can be blended or admixed in any conventional mixing apparatus, such as an extruder or a Banbury mixer.

HYPOTHETICAL EXAMPLES

Nine compositions of the invention are prepared by dry blending together in the appropriate ratios the graft copolymer, styrenic block copolymer, and the ethylene-propylene rubber. These mixtures are then added to the feedthroat of a co-rotating twin screw extruder. The extruder temperature is in the 200°–245° C. range, except for the melt zone, which is 250°–265° C. The extruder is operated at a screw speed of 300 RPM. The blends are extruded into strands which are pelletized. The pelletized blends are molded into test specimens via a reciprocating screw injection molding machine.

The graft copolymer of the above compositions is a graft copolymer of a styrene homopolymer grafted onto a propylene homopolymer backbone made by the previously described peroxide-initiated graft polymerization process wherein an oxygen-free mineral spirit solution of tert-butylperoxy 2-ethylhexanoate is sprayed onto the heated polypropylene (100° C.) and, after a short hold time, styrene is sprayed in. The following grafting conditions are used to prepare the graft copolymers of (a) Examples 1 thru 3:1 pph peroxy ester, hold 15 minutes, 54 pph styrene added at 1.64 pph/min., hold 3 hours at 100° C., then 4 hours at 135° C. with nitrogen purge to deactivate and dry; (b) Examples 4 thru 6: same as (a) except 2.35 pph peroxy ester, hold 10 minutes, and 84.4 pph styrene added at 2.4 pph/min; and (c) Examples 7 thru 9: same as (b) except 105 pph styrene added at 2.5 pph/min. All peroxy ester values are on an active basis.

The propylene polymer used in the preparation of the graft copolymer is a finely divided porous propylene homopolymer (LBD-406A, commercially available from HIMONT Italia S.p.A.) in the form of generally spherical particles having the following characteristics: minimal melt flow rate (ASTM Method D 1238-82, Condition L) 8 dg/min; intrinsic viscosity (method of J. H. Elliott et al., J/Applied Polymer Sci. 14, 2947–2963 (1970)—polymer dissolved in decahydronaphthalene at 135° C.) 2.4 dl/g; surface area (B.E.T.) 0.34 m$^2$/g; weight average diameter 2.0 mm; and pore volume fraction (mercury porosimetry method) 0.33. More than 90% of the pores in the porous particles are larger than 1 micron in diameter. The ethylene-propylene rubber (EPM) used in Examples 4 thru 9 has an ethylene/propylene weight ratio of 57/43 and an intrinsic viscosity of 3.37 dl/g.

Table 1 described the various styrenic block copolymers (S-EP-S, S-EP-S-EP', and S-EB-S') evaluated in the above described examples.

Table II shows the blend compositions described above.

TABLE I

|  | Peak Molecular Weight | Polystyrene Content (%) | Description |
| --- | --- | --- | --- |
| S-EP-S | 62,000 | 18 | 5,600-51,000-5,600 |
| S-EP-S-EP | 64,600 | 23 | 6,700-42,100-8,100-7,700 |
| S-EB-S' | 53,000 | 15 | 5,000-45,000-3,000 |

TABLE II

|  | Ex 1 | Ex 2 | Ex 3 | Ex 4 | Ex 5 | Ex 6 | Ex 7 | Ex 8 | Ex 9 |
| --- | --- | --- | --- | --- | --- | --- | --- | --- | --- |
| Polystyrene in Graft Copolymer (% w) | 31 | 31 | 31 | 42 | 42 | 42 | 54 | 54 | 54 |
| Graft Copolymer (% w) | 85 | 85 | 85 | 85 | 85 | 85 | 85 | 85 | 85 |
| S-EP-S (% w) | 15 |  |  | 7.5 |  |  | 7.5 |  |  |
| S-EP-S-EP (% w) |  | 15 |  |  | 7.5 |  |  | 7.5 |  |
| S-EB-S' (% w) |  |  | 15 |  |  | 7.5 |  |  | 7.5 |
| EPM (% w) |  |  |  | 7.5 | 7.5 | 7.5 | 7.5 | 7.5 | 7.5 |

What is claimed is:

1. An improved rigid thermoplastic composition, wherein the composition comprises from 60% to 95% by weight of the polymer components of a graft copolymer comprising about 10% to 65% by weight of the graft copolymer of a polystyrene grafted onto a backbone of polypropylene, and from 40% to 5% by weight of the polymer components of a rubber component comprising from 20% –100% of the rubber component of one or more elastomeric block copolymers, wherein the improvement comprises selection of a selectively hydrogenated block copolymer having the structure styrene-hydrogenated isoprene-styrene' (S-EP-S') or styrene-hydrogenated butadiene-styrene' (S-EB-S'), wherein the block copolymer has a total peak molecular weight from 30,000 to 150,000 and wherein the peak molecular weight of the S block is greater than the peak molecular weight of the S' block by at least 50%.

2. The composition of claim 1, wherein the peak molecular weight of the S block is from 4,000 to 10,000.

* * * * *